3,173,216
NORTH-SEEKING GYRO
James V. Johnston, 821 Giles Drive, Huntsville, Ala.
Filed May 22, 1962, Ser. No. 197,562
3 Claims. (Cl. 33—226)
(Granted under Title 35, U.S. Code (1952), sec. 266)

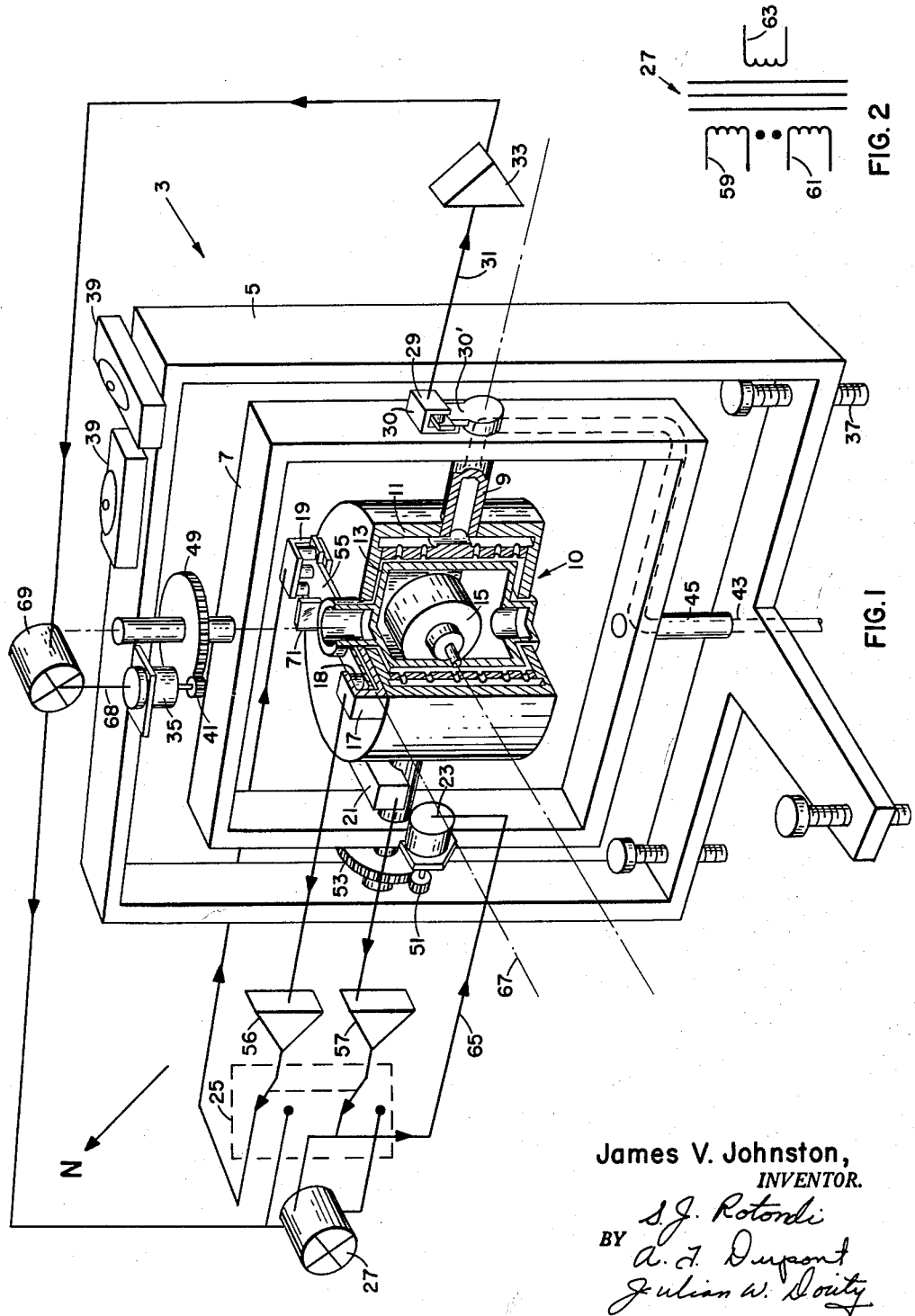

The invention described herein may be manufactured and used by or for the Government of the United States for government purposes without the payment of any royalty thereon.

This invention relates to a gyroscope and more particularly to a north-seeking gyroscope which precesses towards north at a decreasing velocity until the gyro's spin axis is aligned substantially with the north-south axis, at which time all movement ceases.

Most air-bearing gyroscopes and pendulous type gyroscopes oscillate about the north-south axis and it is necessary to measure the angle of oscillation, while the gyro is moving, in order to detremine the true north-south axis.

In my invention the gyro is allowed to precess towards north at a decreasing velocity until the gyro spin axis is aligned with the north-south axis and all movement ceases. The gyro wheel is then stopped by dynamic braking or any other conventional means and its rotation initiated in the opposite direction. The gyro then swings towards the north axis from the opposite direction and its spin axis settles finally in the northerly direction. The average reading between the two positions of the gyro operated in both rotations produces the north direction.

In view of these facts, an object of this invention is to provide a gyroscope which precesses to the north-south axis and then stops precessing.

Another object of this invention is to provide a gyroscope which eliminates the need for measuring the angle of oscillation about the north-south axis in order to determine the location of the north-south axis.

A further object of this invention is to provide an air-bearing gyroscope which does not oscillate about the north-south axis.

The foregoing and other objects of this invention will become more fully apparent from the following detailed description of the embodiment of the invention and from the accompanying drawings, in which:

FIGURE 1 is a pictorial view, partially diagrammatic, of the gyro and its electrical controls.

FIGURE 2 is a schematic showing of the mixing circuits.

In the drawings, wherein for the purpose of illustration, there is shown a preferred embodiment of the invention, the numeral 3 designates an E-rate type air-bearing north-seeking gyroscope comprising: a vertical mounting frame 5; a vertical axis azimuth gimbal 7 rotatably disposed in the vertical mounting frame for rotation about a first axis; a horizontal shaft 9 rotatably disposed in said vertical axis azimuth gimbal for rotation about a second axis which is perpendicular to said first axis; a gyro 10 having a housing 11 attached to the horizontal shaft, a hermetically sealed cylinder 13 disposed within the housing for rotation about a third axis which is perpendicular to said second axis, and a rotor 15 disposed within cylinder 13 for rotation about a fourth axis which is perpendicular to the third axis; pickup means 17 mounted on housing 11 for generating an electrical signal responsive to angular displacement of the cylinder within the housing; a torquing means 19 mounted on housing 11 for aligning the cylinder to null position 67 within the housing when the torquing means is energized by pickup 17; a level indicating device 21 attached to the horizontal shaft for rotation therewith and for generating an electrical signal responsive to angular deviations from the horizontal plane; a first electromotive device 23 disposed for rotating horizontal shaft 9 and housing 11 about the second axis; a second electromotive means 35 disposed for rotating said vertical axis azimuth gimbal; a first mixing means 27; a second mixing means 69; switching means 25 connected to the output of pickup means 17 and level sensing means 21 for completing a circuit between the output of pickup means 17 and torquing means 19 and for completing a circuit between the output of level indicating means 21 and the first electromotive means when the switching circuit is in a first position, and for connecting the output of pickup means 17 to the first and second mixing means, 27 and 69 respectively, and also connecing the output of level sensing means 21 to the first mixing means 27 when the switching circuit is in a second position; conductor 65 positioned for connecting the output of first mixing means 27 to first electromotive means 23 for rotating the horizontal gimbal; conductor 68 positioned for connecting the output of second mixing means 69 to second electromotive means 35 for rotating the vertical axis azimuth gimbal; a horizontal shaft pickup 29, having a portion 30 secured to gimbal 7 and a portion 30' secured to shaft 9, disposed to sense the displacement of the horizontal shaft about the second axis; and conductor means 31 for connecting the output of the horizontal shaft pickup via amplifier 33 to the second mixing circuit which generates a signal responsive to the outputs of both of the pickup means.

The vertical mounting frame is mounted on a platform and leveled by means of leveling screws 37 and spirit levels 39. Mounting frame 5 has a pasageway 43 therein which allows air from an external supply, not shown, to flow through to shaft 45, vertical axis azimuth gimbal 7, horizontal shaft 9 and into the gryo's housing 11 to support the hermetically sealed cylinder 13.

To rotate the vertical axis gimbal 7 when electromative device 35 is energized, the electromotive device has a shaft which carries at its outwardly extending end a geared wheel 41 disposed in mesh relationship with geared wheel 49. The electromotive device 23 which is mounted on vertical axis gimbal 7 operates in the same manner as electromotive device 35 and its function is to rotate horizontal shaft 9 by means of the meshed gears 51 and 53.

In order to allow gyro 10 to rotate in any direction, it is mounted on the horizontal gimbal of the shaft system and is dynamically balanced about all axes so that it is not affected by translational motion and seismic shocks. The gyro is a standard air-bearing gyroscope such as the ones disclosed in Patents 2,925,736 and 2,926,530 and its rotor may be energized in any conventional manner that will allow the rotor to have a swing of at least ±90 degrees about the north-south axis.

For the purpose of determining the angular deviation of the inner cylinder 13 of the gyro with respect to the outer housing 11, there is provided an inductive pickup 17 consisting of differential transformer coils 18 mounted on the gyro's housing and a movable copper plate 55 attached to the inner cylinder. Any deviation of the copper plate from null position 67, due to rotation of cylinder 13, causes the pickup 17 to generate an electrical signal. When switching means 25 is in the first position, this signal may be utilized to energized torquer 19, which is simply an induction motor having plate 55 as its armature, so as to return the inner cylinder to the null position. Both the torquer and the pickup are standard items and their operation and construction are fully described in Patent 2,926,530.

A standard air-bearing pendulum type level indicator 21 such as the one disclosed in Patent 2,958,137 is mounted on the horizontal shaft and generates a signal responsive to deviations of the gyro from the horizontal plane. The outputs of pickup 17 and the level sensing device 21 are amplified by amplifiers 57 and 57 respectively and fed to the switching circuit 25. When the switching circuit is in the first position as shown in FIGURE 1, the output of pickup 17 is connected to torquer 19 via amplifier 56, and the output of level sensing device 21 is connected to electromotive device 23 via amplifier 57.

By changing the position of switch 25, the gyro system is placed in the gyro compassing position. When the gyro system is in the gyro compassing position, the amplified output signal of pickup 17 is fed into mixing means 69 and is combined with the output signal from pickup 29 which is amplified by amplifier 33. The amplified output signal from pickup 17 is also connected to mixing means 27 to be combined with the amplified output signal for level sensing device 21.

In order to compare the output signal from pickup 17 and the output signal from level sensing device 21, a mixing circuit comprising a transformer having a pair of oppositely wound primary windings is utilized (FIGURE 2). The output of the pickup is connected to primary winding 59 and the output of the level sensing device is connected to primary winding 61. When there is a voltage on the primary windings an output signal is induced on output winding 63 and its magnitude and polarity depends on the magnitude and polarity of the two signals supplied to the primary windings. For the purpose of energizing electromotive device 23, output winding 63 of mixing circuit 27 is connected to it and the direction in which the electromotive device rotates depends on the polarity of the signal supplied by output winding 63.

Mixing means 69, which combines the amplified output signals from the two pickups, operates in the same manner as mixing means 27 and its output is fed to electromotive device 35.

The principle of operation of this system is quite different from any other north-seeking gyro. The unit has a self-erecting mode, that is, after the assembly is set up and leveled, the mode switch 25 is switched to a first position shown in FIGURE 1. Gyro pickup 17 drives through amplifier 56 to energize torquer 19. The energization of torquer 19 causes cylinder 13 to rotate to the position where the spin axis of the rotor aligns with the null axis 67 of the gyro. The output signal from level sensing device 21 is fed through amplifier 57 to energize electromotive device 23, and the energization of electromotive device 23 causes the electromotive device to rotate horizontal shaft 9 so that the spin axis of the rotor aligns with the horizontal plane. When this function has been accomplished, the mode switch 25 is then switched to a second position hereafter referred to as the gyro compassing position. The nulling circuit which comprises torquer 19 is removed from the gyro pickup circuit and the inner cylinder 13 is now free to rotate. The gyro senses the horizontal component of the earth's rate of rotation and begins to precess to the axis of rotation of the earth which is in the vertical plane of the north-south axis. This precession causes a displacement of the inner cylinder and the spin axis of the rotor from the null axis which causes pickup 17 to generate a voltage signal responsive to the deviation from the null axis. This signal is amplified and sent to mixer 69 and mixer 27. Mixer 69 receives the outputs of the horizontal shaft pickup 29 and gyro pickup 17 and feeds the combined signal to vertical axis azimuth gimbal servo motor 35. Immediately the azimuth gimbal servo motor starts to drive the azimuth gimbal 7 in the direction of the precessing spin axis of the gyro. However, the other output of the gyro pickup is mixed with the output from the air-bearing pendulum 21 in mixer 27 and the resultant of these two signals is then fed to horizontal axis servo motor 23. The horizontal axis servo motor begins to drive the horizontal shaft in such a direction as to oppose the earth's rate of rotation which the gyro is sensing. This in effect begins to slow down the precessional rate of the gyro. At the same time the output signal from horizontal axis pickup 29 is fed through amplifier 33 and mixed with the output of gyro pickup 17. These two signals oppose each other and the resultant signal decreases the amount of drive on the servo motor for the azimuth gimbal. As the azimuth gimbal 7 slows down, the gyro pickup 17 will attempt to displace further, providing a larger signal to its amplifier 56 and hence back to the azimuth and horizontal drive servos. The controlling factor on this theory of operation is the ratio between the signal produced by gyro pickup 17 and the restoring signal of the air-bearing pendulum 21. As the gyro approaches north it senses the earth's rate of rotation by an ever decreasing value. Consequently the precessional rate decreases with a corresponding decrease in output from gyro pickup 17. The air-bearing pendulum brings the horizontal gimbal closer to a true level condition. The output from horizontal axis pickup 29 is also reduced and in turn provides less signal to mixing network 69. When the gyro aligns itself to a true north-south line, whereby it no longer can sense any earth's rate of rotation, the entire system of servos is now in equilibrium and the null axis and the spin axis are both pointed towards north. There will be an inherent error in this type of system because of bearing friction in the gyro itself, and the equilibrium position of mirror 71 will be slightly off north because of these effects. By taking an optical reading from mirror 71, which is mounted on movable plate 55, or some other type of reading the position of the null and the spin axis at this point can be determined. It is then necessary to stop the gyro, by any conventional means old in the art, and reverse its direction of rotation. By utilizing this principle the errors inherent in the gyro are now induced in the opposite direction. The gyro will now swing to the other side of north, gradually reverse its direction and very slowly approach north from the other side. Once the system has achieved equilibrium on the other side of north again the optical reading is made and the two positional angles are now averaged. This average angle will be a true indication of north.

It is to be understood that the form of the invention that is herein shown and described is the preferred embodiment, and that various changes in the shape, size and arrangement of parts may be resorted to without departing from the spirit of the invention or the scope of the subjoined claims.

I claim:
1. A north-seeking gyroscope comprising:
 (a) a vertical mounting frame;
 (b) a vertical axis azimuth gimbal rotatably disposed in said vertical mounting frame for rotation about a first axis;
 (c) a horizontal shaft rotatably disposed in said vertical axis gimbal for rotation about a second axis which is perpendicular to said first axis;
 (d) a housing attached to said horizontal shaft;
 (e) a hermetically sealed cylinder disposed within said housing for rotation about a third axis which is perpendicular to said second axis;
 (f) a rotor disposed within said cylinder for rotation about a fourth axis which is perpendicular to said third axis;
 (g) pickup means mounted on said cylinder and said housing for generating an electrical signal responsive to angular displacement of said cylinder within said housing;
 (h) a torquing means mounted on said cylinder and said housing for aligning said cylinder to the null position within said housing when the torquing means is energized;
 (i) a level sensing means attached to said horizontal shaft for generating an electrical signal responsive to angular displacement about said second axis;

(j) a first electromotive means disposed for rotating said horizontal shaft and said housing about said second axis;

(k) a second electromotive means disposed for rotating said vertical axis azimuth gimbal about said first axis;

(l) a first mixing means;

(m) a second mixing means;

(n) switching means connected to the output of said pickup means and said level sensing means for completing a circuit between the output of said pickup means and said torquing means and for completing a circuit between the output of said level sensing means and said first electromotive means when said switching means is in a first position, and for connecting the output of said pickup means to said first and said second mixing means and also connecting the output of said level sensing means to said first mixing means when said switching means is in a second position;

(o) means for connecting the output of said first mixing means to said first electromotive means for rotating said horizontal shaft;

(p) means for connecting the output of said second mixing circuit to said second electromotive means for rotating said vertical axis azimuth gimbal;

(q) a horizontal shaft pickup disposed to sense the displacement of said horizontal shaft about said second axis; and (r) means for connecting the output of said horizontal shaft pickup to said second mixing circuit which generates a signal responsive to the outputs of both of said pickup means.

2. A gyroscope comprising:

(a) a mounting frame;

(b) an azimuth gimbal rotatably disposed in said mounting frame for rotation about a first axis;

(c) a shaft rotatably disposed in said second gimbal for rotation about a second axis which is perpendicular to said first axis;

(d) a housing attached to said shaft;

(e) a cylinder rotatably disposed within said housing for rotation about a third axis which is perpendicular to said second axis;

(f) a rotor rotatably disposed within said cylinder for rotation about a fourth axis which is perpendicular to said third axis;

(g) a first pickup means mounted on said cylinder and said housing for generating an electrical signal responsive to angular displacement of said cylinder within said housing;

(h) a second pickup means disposed on said shaft to sense the displacement of said shaft about said second axis;

(i) a control means connected to the output circuits of said first and second pickup means for rotating said azimuth gimbal responsive to the values of the output signals produced by said pickup means;

(j) a level indicating means attached to said shaft for generating an electrical signal responsive to angular displacement of said shaft about said second axis; and (k) a second control means connected to the output circuits of said level indicating means and said first pickup means for rotating said shaft responsive to the polarity and magnitude of the output signals produced by said first pickup means and said level indicating means.

3. The device as set forth in claim 2 wherein said second control means comprises:

(a) a second mixing means electrically connected to the outputs of said first pickup means and said level sensing means for combining the output signals; and (b) a second electromotive means connected to the output of said second mixing means and mounted on said azimuth gimbal for rotating the shaft responsive to the electrical output of said second mixing means.

References Cited by the Examiner
UNITED STATES PATENTS

| | | | |
|---|---|---|---|
| 2,771,779 | 11/56 | Schaffer et al. | 74—5.34 |
| 2,852,943 | 9/58 | Sedgfield | 74—5.7 |
| 2,879,671 | 3/59 | Schulte | 74—5.47 |
| 2,926,530 | 3/60 | Mueller et al. | 74—5.47 |
| 2,958,137 | 11/60 | Mueller | 33—206.5 |

ROBERT B. HULL, *Primary Examiner.*

SAMUEL BOYD, S. FEINBERG, *Examiners.*